(12) United States Patent
Lo

(10) Patent No.: US 8,638,547 B2
(45) Date of Patent: Jan. 28, 2014

(54) MULTIFUNCTIONAL EMERGENCY RESCUE DEVICE

(75) Inventor: Chung-Ho Lo, New Taipei (TW)

(73) Assignee: Masterhold Int'l Co., Ltd., New Taipei (TW)

( * ) Notice: Subject to any disclaimer, the term of this patent is extended or adjusted under 35 U.S.C. 154(b) by 132 days.

(21) Appl. No.: 13/420,953

(22) Filed: Mar. 15, 2012

(65) Prior Publication Data

US 2013/0242470 A1　　Sep. 19, 2013

(51) Int. Cl.
　　*G06F 1/16*　　(2006.01)
(52) U.S. Cl.
　　USPC ............. 361/679.01; 340/573.1; 455/90.1; 455/404.1
(58) Field of Classification Search
　　USPC ........ 361/679.01; 455/404.1, 90.1; 340/573.1
　　See application file for complete search history.

(56) References Cited

U.S. PATENT DOCUMENTS

| | | | | |
|---|---|---|---|---|
| 4,926,496 A | * | 5/1990 | Cole et al. | ........................ 455/77 |
| 5,874,897 A | * | 2/1999 | Klempau et al. | .......... 340/573.1 |
| 7,310,500 B2 | * | 12/2007 | Fujiki | ......................... 455/90.1 |
| 7,980,244 B2 | * | 7/2011 | Boone et al. | ............. 128/200.24 |
| 2010/0160990 A1 | * | 6/2010 | G tzy | ................................. 607/5 |
| 2011/0045795 A1 | * | 2/2011 | Sacknoff | ..................... 455/404.1 |
| 2012/0113575 A1 | * | 5/2012 | Uy et al. | ................... 361/679.01 |

FOREIGN PATENT DOCUMENTS

DE　　　　10352210 A1 *　 5/2004　　........... G08B 25/08

* cited by examiner

*Primary Examiner* — Lisa Lea Edmonds
(74) *Attorney, Agent, or Firm* — Muncy, Geissler, Olds & Lowe, PLLC

(57) ABSTRACT

A multifunctional emergency rescue device includes a main control circuit, a selection switch, an indicator lamp, an annunciator, a battery unit, a connection port module, an external power input socket and output socket. The main control circuit contains a micro control unit (MCU), a power sensing unit, a rectifier and regulator unit, a monitoring unit, and a vibration induction unit. When the selection switch is switched to a first working mode, recharging, rescue, a stable operation to a car electric system are performed. When a second working mode is switched to, electronic devices are recharged at the USB port and the LED lighting lamp illuminates. When a third working mode, an emergency mode, is switched to, the vibration induction unit generates a signal determined by the MCU to drive the annunciator to generate an alarm sound, achieving functions of emergency calling, disaster calling and burglar-proof calling.

8 Claims, 2 Drawing Sheets

MULTIFUNCTIONAL EMERGENCY RESCUE DEVICE

BACKGROUND OF THE INVENTION a) Field of the Invention

The present invention relates to a rescue device, and more particularly to a multifunctional rescue device.

b) Description of the Prior Art

When a vehicle driver is to use the vehicle, it is inevitable that the vehicle will not start. This is primarily caused by insufficient electricity of vehicle batteries and the reason resulting in the insufficient electricity of the vehicle batteries is instability of a vehicle electric system, causing a surge to the vehicle batteries and allowing internal electronic materials to be degraded easily.

In addition, existing portable power equipment often works independently, such as providing rescue to a car; whereas, a cell phone or a laptop computer is designed for a specific object, at most being added with an illumination function.

SUMMARY OF THE INVENTION

The primary object of the present invention is to provide a multifunctional emergency rescue device to solve the shortcomings of the prior art. This multifunctional emergency rescue device is carried easily and can supply stable electricity or rescue to the vehicles, or implement warning, burglar-proofing or calling to a person or an object.

To achieve the abovementioned objects, the present invention provides a multifunctional emergency rescue device which is installed inside a portable body. The multifunctional emergency rescue device includes:

a main control circuit containing a micro control unit (MCU), a rectifier and regulator unit that is electrically connected with the MCU, a power sensing unit that is used to sense an external power and transmits a sensing signal to the MCU to determine whether the power has been inputted, a monitoring unit that is electrically connected with the MCU, and a vibration induction unit that is electrically connected with the MCU;

an external power input socket that is electrically connected with the power sensing unit to input the power;

a battery unit that is electrically connected with the MCU and the monitoring unit, with that a recharging state of the battery unit is monitored by the monitoring unit;

an external power output socket that is electrically connected with the battery unit;

an annunciator that is electrically connected with the MCU;

a connection port module that is electrically connected with the rectifier and regulator unit; and a selection switch that is electrically connected with the MCU.

The selection switch can be used to operate the device for emergency rescue, recharging, illumination, supplying electricity through a USB (Universal Serial Bus) port, responding as an early warning of earthquakes, sending voices for calling, burglar-proofing and functional preparation.

The external power input socket can be inserted with an adapter plug of a solar panel, a wind power generator or an AC (Alternating Current) adapter.

The connection port module includes a cigarette lighter socket, a USB port and a lighting lamp.

A lamp ON/OFF switch is further electrically connected between the lighting lamp and the rectifier and regulator unit.

The lighting lamp is an LED (Light Emitting Diode).

The external power output socket provides for insertion with a battery jumper cable to connect to car batteries, thereby starting a car engine for rescue.

The battery unit includes lithium-iron or other lithium-ion batteries.

The battery unit is parallel connected with a super capacitor to increase a charging-discharging efficiency.

The annunciator is a buzzer.

An indicator lamp is further electrically connected with the MCU to display capacity of the battery unit.

The indicator lamp is an LED.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
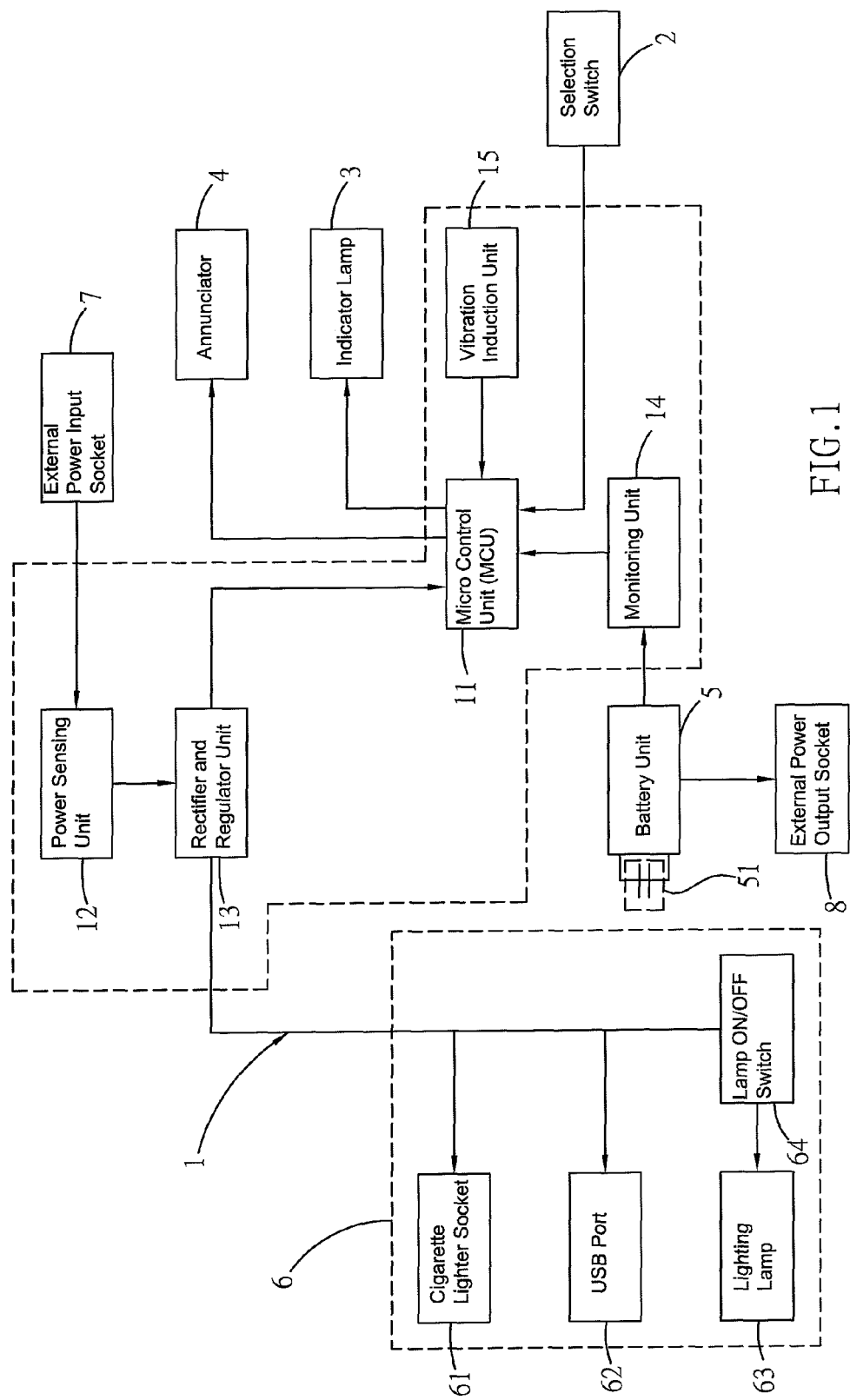
FIG. 1 shows a circuit block diagram of a multifunctional emergency rescue device of the present invention.

Referring to FIG. 1, it shows a circuit block diagram of a multifunctional emergency rescue device of the present invention. As shown in the drawing, the multifunctional emergency rescue device comprises a main control circuit 1, a selection switch 2, an indicator lamp 3, an annunciator 4, a battery unit 5, a connection port module 6, an external power input socket 7 and an external power output socket 8.

The main control circuit 1 includes an MCU 11, a power sensing unit 12, a rectifier and regulator unit 13, a monitoring unit 14 and a vibration induction unit 15.

The MCU 11 is used to receive signals inputted by all units and circuits.

The power sensing unit 12 is electrically connected with the external power input socket 7 to sense an external power and transmits a sensing signal to the MCU 11, with that the MCU 11 determines whether the power has been inputted. In the present drawing, the external power input socket 7 can be inserted with electricity that is provided by a DC (Direct Current) power, such as a solar panel, a wind power generator or an AC adapter.

The rectifier and regulator unit 13 is electrically connected with the external power input socket 7, the power sensing unit 12 and the MCU 11. After an external power has been inputted, the input power is regulated by the rectifier and regulator unit 13 to provide a working voltage required by the main control circuit 1, so that the MCU 11 can recharge the battery unit 5. When recharging, the MCU 11 also drives the indicator lamp 3 to illuminate, meaning that the battery unit 5 is being recharged. The rectifier and regulator unit 13 is further electrically connected with the connection port module 6; the connection port module 6 includes a cigarette lighter socket 61, a USB port 62 and a lighting lamp 63.

The cigarette lighter socket 61 is connected with a cigarette lighter of a car. After connection, the cigarette lighter socket 61 is conducted with a car electric system. Through an operation of the rectifier and regulator unit 13 to a change of electricity of the car electric system, the car electric system can be monitored stably. Furthermore, by using the characteristics of the battery unit 5, a single unit of a large capacitance effect can be formed. This single unit can quickly respond to a change of voltage of the car to compensate for the car system electricity, thereby stabilizing the car electricity, providing electric energy required to ignite an engine, effectively exploding combustible air, increasing power of a car and improving an audio effect of the car. On the other hand, by connecting a DC/AC adapter to the cigarette lighter socket 61, AC electricity can be provided to a laptop computer or other electric appliances. Besides, the USB port 62 can provide DC electricity of 5-volt voltage, allowing a cell phone, an iPad or a tablet personal computer to be recharged. Depending upon capacity of the battery unit 5, the lighting lamp 63 can illuminate continuously for several hundred hours. In the present drawing, the lighting lamp 63 is an LED and is also connected with a lamp ON/OFF switch 64. The lamp ON/OFF switch 64 is electrically connected with the rectifier and regulator unit 13 and after the lamp ON/OFF switch 64 has been turned on, the lighting lamp 63 will illuminate.

The battery unit 5 is electrically connected with the MCU 11 to receive power outputted by the MCU 11 for recharging. In addition, the battery unit 5 is connected with the external power output socket 8 for insertion with a battery jumper cable (not shown in the drawing) to connect to car batteries, thereby starting a car engine for rescue.

In the present drawing, the battery unit 5 includes primarily lithium-iron batteries, other lithium-ion batteries or any accumulators. The battery unit 5 of the present invention can be further parallel connected with a super capacitor 51 to increase a charging-discharging efficiency, which further aids the car electric system to obtain stable voltage, thereby allowing the car engine to ignite powerful sparks under a support of stable voltage at every time of ignition, and enabling the car engine to convert chemical energy effectively.

The monitoring unit 14 is electrically connected with the MCU 11 and the battery unit 5 to monitor a recharging state of the battery unit 5. When the monitored recharging capacity exceeds a setting, a signal is feedback to the MCU 11 and the MCU 11 will stop recharging the battery unit 5 immediately.

The selection switch 2 is electrically connected with the MCU 11 and is switched among different working modes.

When the selection switch 2 is switched to a first working mode, which is a recharging and rescue mode and the system is off, the MCU 11 will recharge the battery unit 5. At this time, the indicator lamp 3 illuminates; whereas, the battery jumper cable is inserted into the external power output socket 8 and is connected to car batteries to start a car engine for rescue. In the present drawing, the indicator lamp 3 is an LED.

When the selection switch 2 is switched to a second working mode for illumination and supplying electricity through the USB port, a user inserts a USB plug (not shown in the drawing) or a device with a USB plug into the USB port 62, and then, a cell phone, an iPad or a tablet personal computer can be recharged. In addition, after the lamp ON/OFF switch 64 has been turned on, the lighting lamp 63 can illuminate.

When the selection switch 2 is switched to a third working mode, which is an emergency mode, as long as the main control circuit 1 tilts or vibration is induced (such as when an aged person or a patient falls, an earthquake is happening or a thief enters into a room and hits the present invention that is put next to a window), the vibration induction unit 15 will generate a signal to be transmitted to the MCU 11, and if the MCU 11 determines the signal as the vibration induction signal, the MCU 11 will output a signal to drive the annunciator 4 to generate an alarm sound to inform the user, thereby achieving objects of emergency calling, disaster calling and burglar-proof calling. In the present drawing, the annunciator 4 is a buzzer.

Figure 3:
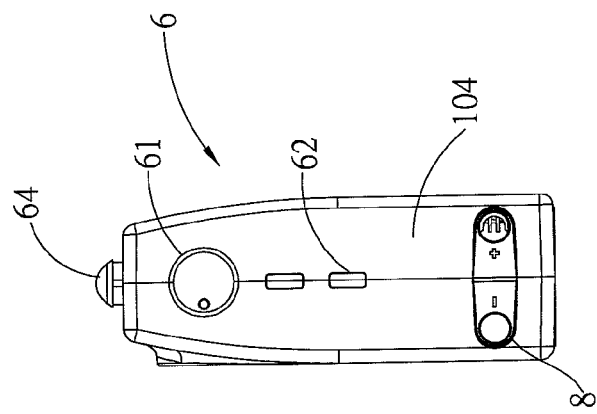
FIG. 3 shows a side view of the multifunctional emergency rescue device of the present invention.
Figure 2:
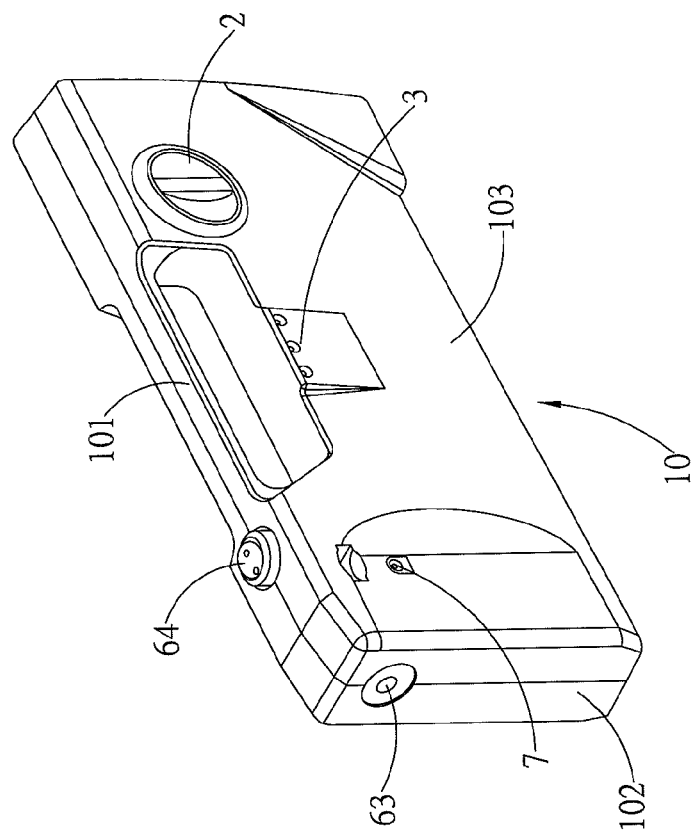
FIG. 2 shows a three-dimensional schematic view of the multifunctional emergency rescue device of the present invention.

Referring to FIG. 2 and FIG. 3, it shows a three-dimensional schematic view and a side view of the multifunctional emergency rescue device of the present invention. As shown in the drawings, the multifunctional emergency rescue device is installed inside a portable body 10 and the portable body 10 is provided with a handle 101. A surface of the handle 101 is provided with the lamp ON/OFF switch 64. After the lamp ON/OFF switch 64 has been turned on, the lighting lamp 63 on an end surface 102 of the portable body 10 can illuminate for lighting. A side surface 103 of the portable body 10 is provided with the selection switch 2 to select among different purposes, the indicator lamp 3 for indicating a state of the battery unit 5, and the external power input socket 7 for insertion with an adapter plug (not shown in the drawings) of a solar panel, a wind power generator or an AC adapter. The cigarette lighter socket 61 and the USB port 62 of the connection port module 6, as well as the external power output socket 8, are provided at the other end surface 104 of the portable body 10, allowing the cigarette lighter socket 61 to connect with a cigarette lighter of a car, stabilizing voltage to increase power of a car, and improving an audio effect of the car. In addition, by connecting a DC/AC adapter to the cigarette lighter socket 61, AC electricity can be provided to a laptop computer or other electrical appliances. The USB port 62 can provide DC electricity of 5-volt voltage, allowing a cell phone, an iPad or a tablet personal computer to be recharged.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A multifunctional emergency rescue device, being installed inside a portable body, comprising:
    a main control circuit, includes a micro control unit (MCU), a rectifier and regulator unit that is electrically connected with the MCU, a power sensing unit that is used to sense an external power and transmit a sensing signal to the MCU to determine whether the power has been inputted, a monitoring unit that is electrically connected with the MCU, and a vibration induction unit that is electrically connected with the MCU;
    an external power input socket, is electrically connected with the power sensing unit to input the power;
    a battery unit, is electrically connected with the MCU and the monitoring unit, with that a recharging state of the battery unit is monitored by the monitoring unit;
    an external power output socket, is electrically connected with the battery unit;
    an annunciator, is electrically connected with the MCU;
    a connection port module, is electrically connected with the rectifier and regulator unit; and
    a selection switch, is electrically connected with the MCU;
    wherein, the selection switch operates the device for various purposes, such as emergency rescue, recharging, illumination, supplying electricity at the USB (Universal Serial Bus) port, responding as an early warning of earthquakes, sending voices for calling and burglar-proofing, as well as functional preparation.

2. The multifunctional emergency rescue device according to claim 1, wherein the external power input socket is inserted with an adapter plug of a solar panel, a wind power generator or an AC (Alternating Current) adapter.

3. The multifunctional emergency rescue device according to claim 1, wherein the connection port module includes a cigarette lighter socket, a USB port and a lighting lamp.

4. The multifunctional emergency rescue device according to claim 3, wherein a lamp ON or OFF switch is further electrically connected between the lighting lamp and the rectifier and regulator unit.

5. The multifunctional emergency rescue device according to claim 1, wherein the external power output socket provides for insertion with a car battery jumper cable to connect to a car electric system, thereby providing highly rated electricity.

6. The multifunctional emergency rescue device according to claim 1, wherein the battery unit includes lithium-iron batteries or other lithium-ion batteries.

7. The multifunctional emergency rescue device according to claim 1, wherein the battery unit is parallel connected with a super capacitor to increase a charging-discharging efficiency for stabilizing voltage.

8. The multifunctional emergency rescue device according to claim 1, wherein the MCU is electrically connected with an indicator lamp.

* * * * *